United States Patent Office 3,324,136
Patented June 6, 1967

3,324,136
PROCESS FOR 1,4-ETHANO-ISOQUINOLIN-3-ONES
Gordon Northrop Walker, Morristown, and Richard Bennett Margerison, Florham Park, N.J., assignors to Ciba Corporation, New York, N.Y., a corporation of Delaware
No Drawing. Filed July 1, 1965, Ser. No. 468,992
5 Claims. (Cl. 260—289)

The present invention concerns and has for its object a new process for the preparation of 2-R-4-$R_2$-1,4-ethano-1,2,3,4-tetrahydro-isoquinolin-3-ones, which are valuable intermediates in the preparation of the corresponding diuretic and antihypertensive 2-R-3-$R_1$-4-$R_2$-1,4-ethano-1,4-dihydro-isoquinolinium salts, in which each of the groups R and $R_1$ is an aliphatic or araliphatic radical and $R_2$ is hydrogen or an aliphatic, araliphatic or aromatic radical. Said final products are described and claimed in copending application Ser. No. 388,690, filed Aug. 10, 1964.

The process of the present invention consists in reacting a 4-$R_2$-1-tetralone-4-carboxylic acid, an ester, amide or the nitrile thereof with the formamide and/or formate of the formulae $HCONHR_3$ and $HCOONH_3R_3$ in the presence of formic acid, in which compounds $R_3$ stands for hydrogen or R and R and $R_2$ have the above-given meaning, and reacting any 2-unsubstituted 4-$R_2$-1,4-ethano-1,2,3,4-tetrahydro-isoquinolin-3-one obtained, or a metal derivative thereof, with a reactive ester of the alcohol R—OH.

More particularly the present process may be depicted as follows:

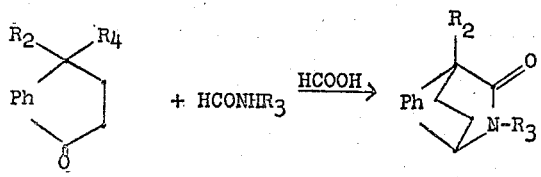

in which Ph stands for a 1,2-phenylene radical, $R_4$ for a free, esterified or amidated carboxyl group, or preferably the cyano group, and $R_2$ and $R_3$ have the meaning given above.

An aliphatic radical R, $R_1$ and $R_2$ is, for example, alkyl, particularly lower alkyl, e.g. methyl, ethyl, n-propyl, isopropyl, n-butyl, isobutyl, n-pentyl, n-hexyl or n-heptyl, as well as higher alkyl, e.g. n-octyl, n-nonyl, n-decyl, n-undecyl or n-dodecyl, alkenyl, such as lower alkenyl, e.g. allyl or methallyl, a cycloaliphatic group, such as cycloalkyl or cycloalkyl-lower alkyl having from three to eight, preferably from five to six, ring carbon atoms, e.g. cyclopropyl, cyclopentyl, cyclohexyl or cycloheptyl; cyclopropylmethyl, 1-cyclopropylethyl, cyclopentylmethyl, 3-cyclopentylpropyl, cyclohexylmethyl, 2-cyclohexylethyl or cycloheptylmethyl, cycloalkenyl or cycloalkenyl-lower alkyl having from five to eight, preferably from five to six, ring carbon atoms, e.g. 2-cyclopentenyl, 1- or 3-cyclohexenyl, 1- or 3-cycloheptenyl or 1-cyclooctenyl; 1-cyclopentenylmethyl, 2-cyclohexenylmethyl or 2-(3-cyclohexenyl)-ethyl.

An araliphatic radical R, $R_1$ and $R_2$ is, for example, a carbocyclic aryl-lower aliphatic group, particularly monocyclic carbocyclic aryl-lower alkyl, e.g. benzyl, 1- or 2-phenyl-ethyl or substituted phenyl-lower alkyl, as well as bicyclic carbocyclic aryl-lower alkyl, e.g. 1- or 2-naphthylmethyl or substituted naphthyl-lower alkyl, or a heterocyclic aryl-lower aliphatic group, especially monocyclic azacyclic aryl-lower alkyl, for example, pyridyl-lower alkyl, e.g. 2- or 4-pyridylmethyl or substituted pyridyl-lower alkyl.

These radicals, especially the lower alkyl groups, may contain one or more than one of the same or of different substituents attached to any of the positions available for substitution. Such substituents are, for example, etherified hydroxy, especially lower alkoxy, e.g. methoxy, ethoxy, n-propoxy, or n-butoxy, esterified hydroxy, especially halogeno, e.g. fluoro, chloro or bromo, trifluoromethyl, amino, such as secondary amino, for example, di-lower alkylamino, e.g. dimethylamino or diethylamino, N,N-alkyleneimino, in which alkylene has from four to seven carbon atoms, e.g. pyrrolidino, piperidino, or 1-6-hexylene-imino, carboxy, carbo-lower alkoxy, e.g. carbomethoxy or carbethoxy, as well as lower alkyl, e.g. methyl, ethyl, n-propyl, isopropyl or n-butyl.

An aromatic radical $R_2$ is particularly carbocyclic aryl, such as monocyclic carbocyclic aryl, e.g. phenyl or substituted phenyl, as well as bicyclic carbocyclic aryl, e.g. naphthyl or substituted naphthyl, or heterocyclic aryl, especially monocyclic heterocyclic aryl, such as monocyclic azacyclic aryl, for example, pyridyl, e.g. 2-, 3- or 4-pyridyl or substituted pyridyl, monocyclic thiacyclic aryl, for example, thienyl, e.g. 2-thienyl or substituted thienyl, or monocyclic oxacyclic aryl, for example, furyl, e.g. 2-furyl or substituted furyl.

In these aryl radicals one or more than one of the positions available for substitution may be substituted, for example by the above-mentioned substituents for the aliphatic radicals.

An aromatic radical $R_2$ is primarily phenyl, (lower alkyl)-phenyl, (lower alkoxy)-phenyl, (halogeno)-phenyl, (trifluoromethyl)-phenyl or (di-lower alkylamino)-phenyl.

In the above formulae the 1,2-phenylene group Ph, is unsubstituted or may be substituted by one or more than one of the same or of different substituents attached to any of the positions available for substitution, such substituents are those mentioned before. It stands primarily for 1,2-phenylene, (lower alkyl)-1,2-phenylene, (lower alkoxy) 1,2 - phenylene, (halogeno)-1,2-phenylene, (trifluoromethyl)-1,2-phenylene or (di-lower alkylamino)-1,2-phenylene.

An ester of the 4-$R_2$-1-tetralone-4-carboxylic acid is, for example, such of an aliphatic or araliphatic alcohol, preferably of a lower alkanol, e.g. methanol, ethanol, n-, i- or sec. propanol, n-, i-, sec. or tert. butanol, or of a phenyl-lower alkanol, e.g. benzyl alcohol.

The formic acid used in the present process, preferably is concentrated aqueous formic acid having, for example, a strength between about 90 to 98%.

Any 2-unsubstituted 4-$R_2$-1,4-ethano-1,2,3,4-tetrahydro-isoquinolin-3-one obtained may be converted into a metal derivative thereof, such as an alkali metal, e.g. sodium or potassium derivative thereof, for example, by reaction with such a metal, a hydride or amide thereof.

A reactive ester of the alcohol R—OH is, for example, that of a hydrohalic acid, e.g. hydrochloric, hydrobromic or hydriodic acid, of sulfuric acid or of a strong organic acid, particularly a strong organic sulfonic acid, e.g. methane sulfonic, ethane sulfonic, 2-hydroxyethane sulfonic, benzene sulfonic, 4-bromobenzene sulfonic or p-toluene sulfonic acid.

The above reactions are carried out in the usual manner by combining the reactants in the presence or absence of a diluent, preferably such that is inert to the reactants and is a solvent thereof, in the presence or absence of a catalyst, condensing or neutralizing agent, while cooling, at room temperature or advantageously at elevated temperatures, under atmospheric or superatmospheric pressure and/or in the atmosphere of an inert gas, e.g. nitrogen. The main reaction advantageously is carried out in a boiling mixture of formic acid and the formamide, containing a small amount of the formate shown above, without any additional diluent.

The invention also comprises any modification of the process wherein a compound obtainable as an intermediate at any stage thereof is used as starting material and the remaining steps are carried out or the process is discontinued at any stage thereof or in which the starting materials are formed under the reaction conditions or are used in the form of their salts. Mainly those starting materials should be used which contain the preferred substituents or moieties respectively.

The starting materials are known or, if new, may be prepared according to known methods, see for example, W. Herz and G. Caple in J. Org. Chem. 29, 1691 (1964).

The following examples are intended to illustrate the invention and are not to be construed as being limitations thereon. Temperatures are given in degrees centigrade and all parts are parts by weight.

*Example 1*

The mixture of 20 g. 4-carbamyl-4-phenyl-1-tetralone, 150 ml. formamide, 75 ml. formic acid and 30 g. ammonium formate is refluxed for 5½ hours and allowed to stand at 100° on a steam cone overnight. It is then refluxed again 3½ hours the next day. On cooling the solution the crude lactam formed crystallizes out directly. It is filtered off and recrystallized from methanol to yield the 1,4-ethano-4-phenyl-1,2,3,4-tetrahydro-isoquinolin-3-one of the formula

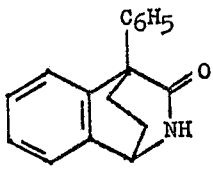

melting at 265–267°.

*Example 2*

A solution of 150 g. 4-cyano-4-phenyl-1-tetralone, 26 g. ammonium formate, 185 ml. 90% formic acid and 750 ml. formamide is refluxed for two days. Then the excess formic acid and formamide is removed by distillation in vacuo. To the semi-crystalline residue 350 ml. methanol are added, the mixture is warmed and then filtered. After drying the filter residue in vacuo, there is obtained the 1,4-ethano-4-phenyl-1,2,3,4-tetrahydro-isoquinolin-3-one melting at 260–265°, which is identical with the product obtained according to Example 1.

*Example 3*

To a solution of 10 g. 4-carbamy-4-phenyl-1-tetralone in 50 ml. N-methylformamide and 28 ml. 98% formic acid, 1.0 g. anhydrous methylamine is added. The solution is refluxed three days, during which time a small amount of distillate is removed in order to keep the reaction temperature at 150–155°. After removal of the excess formic acid and N-methylformamide by distillation in vacuo, the solidified residue is heated with 15 ml. methanol and the suspension obtained is filtered. The residue of the stripped methanol mother liquor is recrystallized from isopropanol and combined with the filter residue. There is obtained the 1,4-ethano-2-methyl-4-phenyl-1,2,3,4-tetrahydroisoquinolin-3-one of the formula

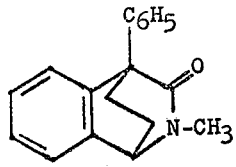

melting at 194.8–197.4°.

*Example 4*

To a solution of 10 g. 4-cyano-4-phenyl-1-tetralone in 50 ml. N-methylformamide and 28 ml. 98% formic acid, 1.0 g. anhydrous methylamine is added. The solution is refluxed three days during which time a small amount of distillate is removed to maintain a reaction temperature of 150–155°. After removal of the excess formic acid and N-methylformamide by distillation in vacuo, the residue is recrystallized from 25 ml. methanol. After drying at 70° in vacuo, there is obtained the 1,4-ethano-2-methyl-4-phenyl-1,2,3,4-tetrahydro-isoquinolin-3-one melting at 189.9–194.8°. It is identical with the product obtained according to Example 3.

*Example 5*

To a stirred suspension of 50 g. 1,4-ethano-4-phenyl-1,2,3,4-tetrahydro-isoquinolin-3-one in 200 ml. N-methyl-pyrrolidone 12 g. of a 53% suspension of sodium hydride in mineral oil, are added within 10 minutes. The resulting solution is stirred one hour at 32–60°, and then one hour at room temperature before adding 35 g. methyl iodide. The solution is stirred over the weekend, thereupon diluted with 200 ml. water, chilled two hours in an ice bath, and then filtered. After washing the filter cake with 200 ml. water it is dried at 70° in vacuo to yield the 1,4-ethano-2-methyl-4-phenyl-1,2,3,4-tetrahydro-isoquinolin-3-one melting at 194–196°; it is identical with the product obtained according to Example 3.

It can be converted into the valuable final product disclosed in Example 2 of copending application Ser. No. 388,690, as follows:

To a slurry of 13.15 g. 1,4-ethano-2-methyl-4-phenyl-1,2,3,4-tetrahydro-isoquinolin-3-one in 150 ml. toluene 30 ml. of a 2.04 molar methyl lithium solution in toluene are added within 10 minutes. After adding 45 ml. of toluene, the solution is warmed 1½ hours to 71–75°. After cooling to room temperature, 2 ml. methanol are added to decompose the excess methyl lithium followed by 50 ml. water. The separated organic solution is washed five times with 50-ml. portions of water until neutral, the toluene solution is filtered and then stripped in vacuo. The resulting crystalline residue is dissolved in a mixture of 4.0 ml. concentrated hydrochloric acid and 75 ml. isopropanol and after chilling the solution overnight at −10°, the precipitate formed is filtered off, washed with isopropanol and dried at 70° in vacuo. There is obtained the solvated 2,3-dimethyl-1,4-ethano-4-phenyl-1,4-dihydro-isoquinolinium chloride of the formula

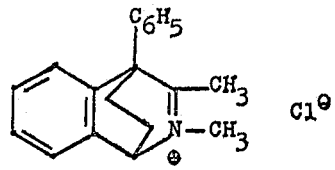

melting at 240–242° (dec.). Its treatment with five times the amount of 90% acetone at reflux for ½ hour, cooling and filtering at room temperature yields, after drying at 70° in vacuo, the monohydrate thereof melting also at 240–242° (dec.).

The starting material may be prepared as follows:

To a mixture of 232 g. 4-cyano-4,4-diphenylbutyric acid and 300 ml. benzene 110 ml. thionyl chloride are added within 5 minutes. The resultant mixture is slowly heated to reflux, and then refluxed two hours. The solvent and excess thionyl chloride is removed in vacuo, 100 ml. benzene are added to the residue and the mixture stripped to dryness again. The next day the acid chloride obtained is dissolved in 150 ml. methylene chloride and the solution is added within ½ hour to a slurry of 176 g. aluminum chloride in 400 ml. methylene chloride, keeping the temperature below 15° with cooling. The reaction mixture is slowly heated to reflux, and then refluxed 4 hours until the hydrogen chloride evolution ceases. The reaction mixture is cautiously poured onto 600 g. ice and 50 ml. concentrated hydrochloric acid, then the separated organic layer is successively washed with 250 ml. 10% hydrochloric acid, 650 ml. 10% sodium hydroxide solution, and twice with 500-ml. portions of water. After drying and treating the methylene chloride solution with carboparaffin, the solvent is removed finally in vacuo. Recrystallization of the residue from 550 ml. isopropanol yields 188 g. 4-cyano-4-phenyl-2-tetralone melting at 110–112°.

What is claimed is:
1. Process for the preparation of 2-R-4-$R_2$-1,4-ethano-1,2,3,4-tetrahydro-isoquinolin-3-ones having the formula

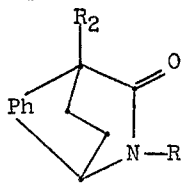

in which Ph is a member selected from the group consisting of 1,2-phenylene, (lower alkyl)-1,2-phenylene, (lower alkoxy)-1,2-phenylene, (halogeno) - 1,2-phenylene, (trifluoromethyl)-1,2-phenylene and (di-lower alkylamino)-1,2-phenylene, each of R and $R_2$ is a member selected from the group consisting of lower alkyl, higher alkyl, lower alkenyl, cycloalkyl and cycloalkyl-lower alkyl having from three to eight ring carbon atoms, cycloalkenyl and cycloalkenyl-lower alkyl having from five to eight ring carbon atoms, at most bicyclic carbocyclic aryl-lower alkyl, monocyclic heterocyclic aryl-lower alkyl, at most bicyclic carbocyclic aryl and monocyclic heterocyclic aryl, wherein the compound of the formula

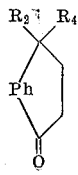

in which $R_4$ is a member selected from the group consisting of carboxy, carbo-lower alkoxy, carbo-phenyl-lower alkoxy, carbamyl and cyano, is reacted with a member selected from the group consisting of the formamide $HCONHR_3$ and the formate $HCOONH_3R_3$ in which $R_3$ is a member selected from the group consisting of hydrogen and R, in the presence of formic acid, and reacting a member selected from the group consisting of a 2-unsubstituted 4-$R_2$-1,4 - ethano - 1,2,3,4 - tetrahydroisoquinolin-3 -one obtained and an alkali metal derivative thereof, with a member selected from the group consisting of an R-halide, R-sulfate and R-sulfonate.

2. Process as claimed in claim 1, wherein the formic acid used is concentrated aqueous formic acid having a strength between 90 and 98%.

3. Process as claimed in claim 1, wherein 4-carbamyl-4-phenyl-1-tetralone is refluxed with a member selected from the group consisting of formamide together with ammonium formate and N-methylformamide together with methylammonium formate, in the presence of formic acid.

4. Process as claimed in claim 1, wherein 4-cyano-4-phenyl-1-tetralone is refluxed with a member selected from the group consisting of formamide together with ammonium formate and N-methylformamide together with methyl ammonium formate, in the presence of formic acid.

5. Process as claimed in claim 1, wherein the sodium salt of 1,4 - ethano - 4 - phenyl - 1,2,3,4 - tetrahydro-isoquinolin-3-one is reacted with methyl iodide.

References Cited

Finar, Organic Chemistry, vol. 1, Longmans, 3rd ed., pp. 252, 547 and 754 (1959)

Wheland Advanced Organic Chemistry, 2nd ed., p. 373.

ALEX MAZEL, *Primary Examiner.*

DONALD G. DAUS, *Assistant Examiner.*